M. K. McMULLIN.
METHOD OF AND APPARATUS FOR SPLITTING GLASS CYLINDERS.
APPLICATION FILED NOV. 8, 1909.

998,254.

Patented July 18, 1911.

Witness:
Chas. S. Lepley.
Fredk. Scanf.

Inventor:
Matthew K. McMullin
By F. W. H. Clay, atty.

UNITED STATES PATENT OFFICE.

MATTHEW K. McMULLIN, OF PITTSBURG, PENNSYLVANIA, ASSIGNOR TO WINDOW GLASS MACHINE COMPANY, OF PITTSBURG, PENNSYLVANIA, A CORPORATION OF NEW JERSEY.

METHOD OF AND APPARATUS FOR SPLITTING GLASS CYLINDERS.

998,254.  Specification of Letters Patent.  Patented July 18, 1911.

Application filed November 8, 1909. Serial No. 526,721.

*To all whom it may concern:*

Be it known that I, MATTHEW K. McMULLIN, a citizen of the United States, residing at Pittsburg, in the State of Pennsylvania, have invented a new and useful Improvement in Methods of and Apparatus for Splitting Glass Cylinders, of which the following is a specification.

My invention relates generally to the art of making window glass from drawn or blown cylinders, or "rollers," and particularly to means for splitting the cylinders for the purpose of flattening into sheets.

The principal object of the invention is to prevent the edges of a split cylinder from overlapping, grinding or knocking together when the split occurs and separate the edges.

I have illustrated the invention in the accompanying drawing in two forms.

Figure 1:
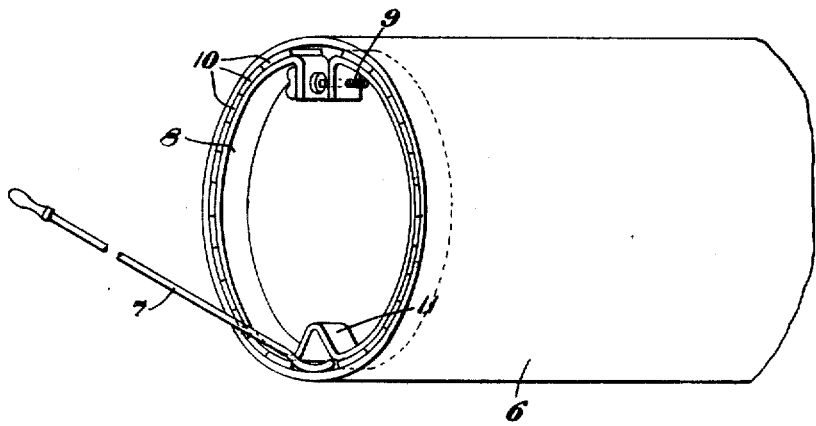
Figure 2:
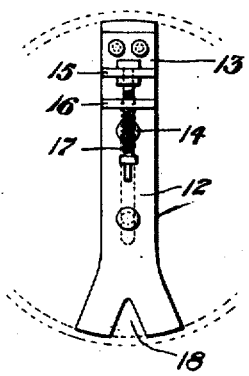
Figure 3:
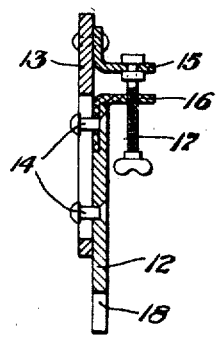
Figure 4:
Figure 5:
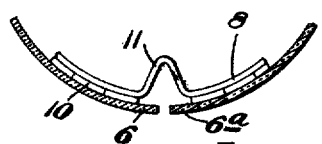

Figure 1 is a perspective view of the end of a glass cylinder with my appliance in place therein. Figs. 2 and 3 are respectively a front elevation and a central vertical section of a modified form of device for the same purpose. Figs. 4 and 5 represent partial sections of a glass cylinder showing, respectively, the positions taken by the edges of the split cylinder when split without the use of my invention, and then when the invention is used.

In the splitting of glass cylinders the tension of the cylinder is such that as the cylinder is split or cracked open longitudinally, the split edges are apt to strike or grind together, or slide sidewise and overlap, as shown in Fig. 4. This often breaks the entire cylinder and attempts have been made to overcome it by annealing the cylinder before splitting. This action occurs in drawn glass cylinders as well as in blown glass cylinders.

My invention is designed to overcome this difficulty in cracking or breaking of the cylinders owing to the interaction of the edges when split; and it consists in applying outward pressure to hold the edges against such action during splitting as well as in the method or series of steps involved. The outward pressure may be exerted throughout the circumference or at separate points, but should be exerted on each side of the splitting line.

In carrying out the method and using the device, after splitting the cylinder the pressure is relaxed gradually to allow the split edges to slowly come together. This gradual release prevents breakage and the device is then removed before the cylinder is taken to the flattening oven. The cylinder may be taken to the flattening oven with the edges either butted together or overlapping.

In the form of the device shown in Fig. 1, the cylinder 6, when ready to be longitudinally split, is provided with an expansion device, preferably consisting of a circular frame or band of iron, 8, which may be provided with such adjusting means as the screw 9, to make it fit tightly in the cylinder, and is covered with blocks of wood or asbestos or the like, 10, to prevent scratching the glass. The band 8 has a reëntrant or open portion 11 to allow the insertion of a splitting device such as a diamond or the hot iron 7, which is moved along a longitudinal line, for heating and splitting in the usual way. When the split occurs, the pressure downward and radially outward on the respective sides of the split will cause the edges to remain edged, or slightly separate, as shown at 6 and 6ª in Fig. 5; thereby removing all danger of injury by the cylinder edges striking or slipping past each other.

The particular form of the spreading device is not material to my invention; and I have illustrated in Figs. 2 and 3 a modification, in which there is a wooden strut 12 spliced on to a supplemental strut 13 by bolts 14, the two parts being provided with lugs 15 and 16 and an adjusting screw 17 engaging them. The strut of course must have an open slot 18 at the bottom to admit the cracking iron 7 or other splitting tool. The downward pressure on the two legs of this split strut distorts the glass, and not only prevents the edges of the cracked cylinder from striking, but causes them to separate by the resilient action of the glass cylinder.

The advantages of my invention will be obvious to those skilled in the art, since breakage and cracking of the cylinders from the grinding, striking or overlapping of the edges when split is avoided.

I claim as my invention the following:

1. In the splitting of glass cylinders, the steps consisting of applying outward or bursting strain to the cylinder, and splitting the cylinder lengthwise while under said strain.

2. In the splitting of glass cylinders, the steps consisting of applying an outward pressure on the interior of the cylinder, and splitting the cylinder lengthwise while maintaining such pressure.

3. In the splitting of glass cylinders, the steps consisting of exerting an outward pressure on both sides of the portion to be split, and splitting the cylinder longitudinally between said pressure portions.

4. A splitting device for glass cylinders, consisting of a frame arranged to be inserted within the cylinder and exert outward pressure thereon, said frame being arranged to allow the insertion of a splitting tool.

5. Means for preventing the breaking of glass cylinders in splitting, comprising an adjustable band arranged to be inserted within the cylinder and having its circumference interrupted to allow the insertion of a splitting tool.

In testimony whereof I have hereunto signed my name in the presence of the two subscribed witnesses.

MATTHEW K. McMULLIN.

Witnesses:
ALICE A. TRILL,
F. W. H. CLAY.